US008660867B2

(12) United States Patent
Krivopaltsev et al.

(10) Patent No.: US 8,660,867 B2
(45) Date of Patent: Feb. 25, 2014

(54) METHOD AND SYSTEM FOR AUTOMATED TRANSPORTATION USE TRACKING AND BILLING

(75) Inventors: Eugene Krivopaltsev, San Jose, CA (US); Ajay Tripathi, San Ramon, CA (US); Alexander S. Ran, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/352,129

(22) Filed: Jan. 17, 2012

(65) Prior Publication Data

US 2013/0185123 A1 Jul. 18, 2013

(51) Int. Cl.
*G06Q 10/00* (2012.01)

(52) U.S. Cl.
USPC .................. 705/5; 705/6; 705/1.1; 455/456.5

(58) Field of Classification Search
USPC ........................................................... 705/13
See application file for complete search history.

(56) References Cited

U.S. PATENT DOCUMENTS 6,191,708 B1 * 2/2001 Davidson ...................... 701/465
2004/0015475 A1 * 1/2004 Scheepsma ...................... 707/1
2004/0049424 A1 * 3/2004 Murray et al. .................. 705/14
2005/0004757 A1 * 1/2005 Neeman et al. ............... 701/210
2008/0195428 A1 * 8/2008 O'Sullivan ........................ 705/6
2008/0215380 A1 * 9/2008 Graeber ............................ 705/5
2008/0277183 A1 * 11/2008 Huang et al. .................. 180/271
2009/0204449 A1 * 8/2009 Waytena et al. .................. 705/5
2010/0144375 A1 * 6/2010 Pfister et al. ............... 455/456.5
2010/0197325 A1 * 8/2010 Dredge ...................... 455/456.3
2011/0047037 A1 * 2/2011 Wu ................................ 705/17
2011/0060600 A1 * 3/2011 Fox et al. ....................... 705/1.1

* cited by examiner

*Primary Examiner* — Brian Epstein
(74) *Attorney, Agent, or Firm* — Hawley Troxell Ennis & Hawley LLP; Philip McKay; Sean P. Lewis

(57) ABSTRACT

A user registers with an automated transportation use and billing system. The user's geographical location/position is monitored and periodically compared with the geographical location/position of one or more public transportation systems. When a determination is made that the user's geographical location/position is the same as the geographical location/position of a public transportation system, an assumption is made that the user is making use of the public transportation system and once the user's geographical location/position data differs from the public transportation system's geographical location/position data, it is further assumed that the user is no longer making use of the public transportation system. Data indicating the users assumed use of the public transportation system, calculated as described above, is then recorded and credited to the user's account.

20 Claims, 2 Drawing Sheets

METHOD AND SYSTEM FOR AUTOMATED TRANSPORTATION USE TRACKING AND BILLING

BACKGROUND

As the price of oil continues to rise, and the environmental consequences of the use of fossil fuels becomes more apparent and severe, the world continues to search for ways to decrease the consumption of this precious, and arguably harmful, commodity. It has long been recognized that one way to significantly decrease the consumption of fossil fuels is to increase the use of public transportation systems such as buses, subways, trains, streetcars, and various other means of group transportation. In addition, the use of public transportation systems decreases overall traffic and congestion issues and thereby results in less wear and tear on transportation infrastructure, such as highways and city streets, thereby saving increasingly scarce taxpayer funds for other services.

Despite the almost universally recognized advantages of public transportation systems, many individuals continue to use their own private transportation means such as private cars. One reason many people forgo public transportation is a perception that public transportation requires the user to add yet more complication to what is often an already hectic daily schedule.

As one example, currently, persons desiring to use public transportation systems must first obtain a ticket, token, or pass to use the public transportation system. In many cases, obtaining the ticket, token, or pass requires standing in line at a vending machine or kiosk and then providing payment for the ticket, token, or pass, often at the time of use. In other cases, multiuse passes can be obtained, and paid for, prior to use, which must then be presented at the time of use of the public transportation system.

In either case, currently, a user of a public transportation system must typically carry a physical ticket, token, or pass with them and then take the time to find, and present, the ticket, token, or pass when they desire to use the public transportation system. For many people, this, in and of itself, is a significant inconvenience as a user is forced to keep track of yet another item that can easily be misplaced and/or lost. In addition, if the users are carrying packages, briefcases, or other items that otherwise occupy their hands, the users must put down their load and search through their pockets, purses, or briefcases for the required ticket, token, or pass. Even more problematic, in cases where the ticket, token, or pass cannot be found, a new ticket, token, or pass must be obtained; thereby further increasing the inconvenience and consuming even more user time and money.

Currently, once the ticket, token, or pass is obtained and found, the ticket, token, or pass must then be physically, and/or electronically, presented in order to gain admission to the public transportation system.

As a result of the delays inherent in the current ticket, token, and pass systems described above, many users of public transportation routinely miss their buses, subways, or trains while trying to obtain, and/or find, and/or present, their ticket, token, or pass. Therefore, the current ticket, token, and pass systems feed the perception that public transportation is simply too inconvenient and is yet another "hassle" in a world where people are often already trying to cope with overly demanding schedules, and keep track of a seemingly never ending list of tasks, procedures, and personal items. In addition, in cases where people are already using the public transportation systems on a regular basis, the current system places an undue burden on these users and creates inefficiency and frustration.

What is needed is a system and method that allows people to use public transportation systems without requiring the user to obtain, carry around, and present physical tickets, tokens, passes, or any other device beyond what the user would normally carry. In this way, public transportation would become more user-friendly, efficient and, hopefully, more widely adopted and used.

SUMMARY

In accordance with one embodiment, a method and system for automated transportation use tracking and billing includes a process for providing an automated transportation use and billing system whereby, in one embodiment, a user initially subscribes, or otherwise registers with, an automated transportation use and billing system via a user mobile computing system, such as a mobile phone associated with the user, and/or one or more automated transportation use and billing system applications, such as a mobile application implemented, at least in part, on the user mobile computing system.

In one embodiment, the user's geographical location/position is monitored via the user's mobile computing system and/or one or more automated transportation use and billing system applications. In one embodiment, the geographical location/position of one or more elements of one or more public transportation systems is also monitored and periodically compared with the user's geographical location/position. In one embodiment, when a determination is made that the user's geographical location/position is the same as the geographical location/position of a public transportation system element, such as a bus or subway train, an assumption is made that the user is making use of the public transportation system, e.g., the user has boarded the public transportation system element. In one embodiment, once the user's geographical location/position data differs from the public transportation system element's geographical location/position data, it is further assumed that the user is no longer making use of the public transportation system, e.g., the user has gotten off at his or her desired stop. In one embodiment, data indicating the users assumed use of the public transportation system, calculated as described above, is then recorded and credited to the user's account. In one embodiment, at predetermined intervals of time, such as monthly, the user is automatically provided a bill, and/or charged, for his or her use of the public transportation system. In one embodiment, the user is billed via the user's mobile computing system and/or the one or more automated transportation use and billing system applications, and/or using the registration data provided by the user at the time the user signed up for the automated transportation use and billing system.

Using one embodiment of the method and system for automated transportation use tracking and billing discussed herein, once a user registers with the automated transportation use and billing system, the user is automatically provided virtually unlimited access to public transportation via a mobile computing system, such as a mobile phone. Consequently, using one embodiment of the method and system for automated transportation use tracking and billing discussed herein, there is no need to obtain tickets, tokens, or passes, or to keep any additional item on the user's person other than a mobile computing system, such as a mobile phone, which the user normally carries with them anyway. In addition, using one embodiment of the method and system for automated transportation use tracking and billing, the user's public transportation usage is tracked and the user is billed automatically on a periodic basis. Consequently using one embodiment of the method and system for automated transportation use tracking and billing, the user is provided virtually "hands free" access to public transportation; thereby making public transportation more user-friendly, efficient, and acceptable.

In addition, one embodiment of the method and system for automated transportation use tracking and billing discussed herein, the user's public transportation usage is tracked and the user is automatically provided a receipt/summary of the user's public transportation system use and costs that can be used for budgetary and tax purposes. Consequently, the user is spared the difficulty of retaining individual receipts.

In addition to being a direct benefit to users of public transportation systems, the method and system for automated transportation use tracking and billing discussed herein, can also significantly benefit providers of public transportation systems by not only attracting more users, but also by eliminating infrastructure and overhead currently required to provide token, pass, and ticket systems. As an example, the implementation of one embodiment of the method and system for automated transportation use tracking and billing discussed herein eliminates the need for ticket/token kiosks, turnstiles and/or gates, and ticket/token selling agents. These cost savings can then be passed on to users to make the public transportation systems an even more attractive alternative to private vehicles.

Figure 1:
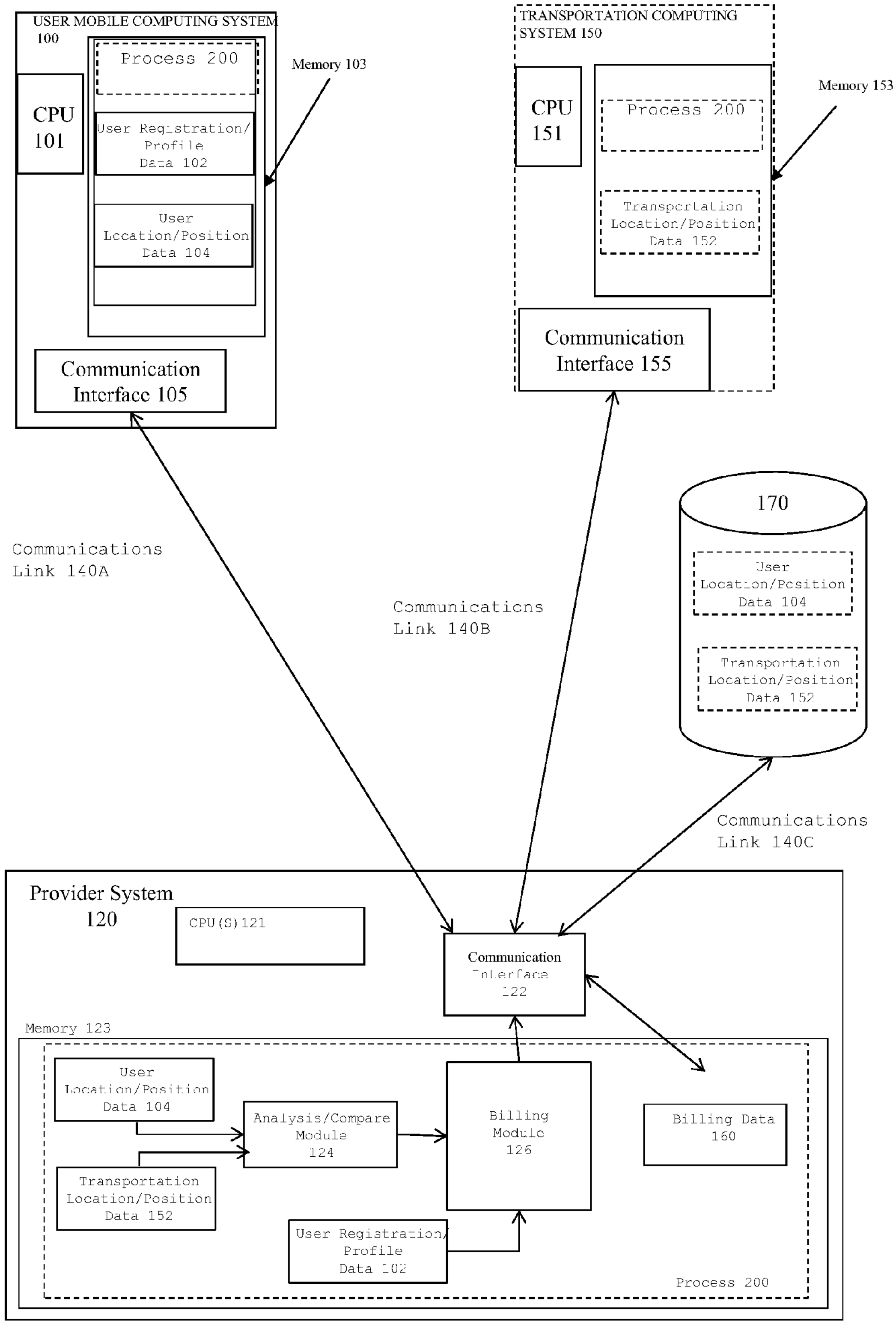
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for automated transportation use tracking and billing includes a process for providing an automated transportation use and billing system.

In various embodiments, the process for providing an automated transportation use and billing system is provided by, used by, and/or otherwise associated with, one or more public transportation systems. Herein, the term "public transportation system" includes any transportation system designed to carry multiple passengers. This includes transportation systems owned and operated by governments, municipalities, or private parties.

In various embodiments, the process for providing an automated transportation use and billing system is provided by, and/or otherwise associated with, one or more public transportation systems such as, but not limited to, one or more publically operated subway systems, train systems, street car systems, bus systems, and/or any other public transportation system owed and/or operated, in whole or in part, by a public institution, as discussed herein, and/or as known in the art at the time of filing, and/or as developed after the time of filing.

In various embodiments, the process for providing an automated transportation use and billing system is provided by, and/or otherwise associated with, one or more privately owned and/or operated public transportation systems such as, but not limited to, one or more privately owned subway systems, train systems, street car systems, bus systems, taxi systems, airlines, and/or any other public transportation system owed and/or operated, in whole or in part, by a private party or institution, as discussed herein, and/or as known in the art at the time of filing, and/or as developed after the time of filing.

In one embodiment, a user subscribes, or otherwise registers with, an automated transportation use and billing system.

In one embodiment, the user subscribes, or otherwise registers with, the automated transportation use and billing system via a user interface provided through a web-based system. In one embodiment, a user mobile computing system, such as a mobile phone associated with the user, is provided with, and/or implements, one or more automated transportation use and billing system applications, or "apps", such as a mobile automated transportation use and billing system application, or mobile automated transportation use and billing system app.

Herein, the terms "application" or "app." include, but are not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing.

In one embodiment, the user subscribes, or otherwise registers with, the automated transportation use and billing system only once, i.e., before the first use of the automated transportation use and billing system.

In various embodiments, as part of the registration process, the user provides user profile information. In one embodiment, the user profile information is provided by the user through the user mobile computing system. In one embodiment, the user profile information is provided by the user via a user interface device such as, but not limited to, a keyboard, mouse, touchpad, voice command recognition system, or any other device capable of providing user input to a computing system and/or for translating user actions into computing system operations, whether available or known at the time of filing or as developed later.

In various embodiments, the user profile information includes, but is not limited to, one or more of: data indicating the user's name; data indicating the user's e-mail address or user associated social media accounts; data indicating the user's telephone number and/or SMS contact number; data indicating the user's physical address; data indicating a payment method and/or credit card/debit card information associated with the user; data indicating the user's agreement to various terms and conditions of use; and/or any other user profile data desired/required by the provider of the automated transportation use and billing system.

In various embodiments, as part of the registration process, data is obtained designating/registering a user mobile computing system associated with the user to be used with the automated transportation use and billing system. In addition, as part of the registration process, the user provides data indicating that the user gives the automated transportation use and billing system permission to track the geographical location/position of the designated/registered user mobile computing system.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein.

In addition, as used herein, the term mobile computing system, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the mobile computing systems are connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, once the user has registered with the automated transportation use and billing system, provided user profile data, and designated/registered the user mobile computing system, the geographical location/position of the user mobile computing system, and presumably the user, is monitored/tracked.

In various embodiments, the geographical location/position of the user mobile computing system is monitored/tracked based on analysis of a communication signal emitted by the user mobile computing system, and/or the relay stations used by the user mobile computing system. In various embodiments, the geographical location/position of the user mobile computing system is monitored/tracked using a Global Positioning Satellite (GPS) system and/or a GPS capability provided with the user mobile computing system. In various embodiments, the position of the user mobile computing system is provided by the user mobile computing system itself via one or more data links. In various embodiments, the position of the user mobile computing system is determined and/or provided by any method, means, mechanism, or procedure for determining a position of a user mobile computing system as discussed herein, and/or as known in the art at the time of filing, and/or as developed after the time of filing.

In various embodiments, the geographical location/position of the user mobile computing system is monitored on a periodic basis such as, but limited to, every few seconds, every few fractions of a second, every minute, or every few minutes.

In one embodiment, transportation geographical location/position data indicating the geographical location/position of one or more transportation elements within one or more transportation systems is obtained and/or monitored.

In various embodiments, the transportation geographical location/position data is obtained in relative real time from one or more computing systems and/or signals onboard the one or more transportation elements within the one or more transportation systems. As one illustrative example, in one embodiment, the transportation geographical location/position data for a given bus is obtained from a position/location signal generated on board the bus. As another illustrative example, in one embodiment, the transportation geographical location/position data for a given subway car is obtained from a computing system on the subway car that indicates the position/location of the subway car.

In some embodiments, the transportation geographical location/position data is obtained from a database that includes data regarding the estimated position of the one or more transportation elements within the one or more transportation systems as determined using the normal operating schedules and data indicating any delays. In various embodiments, the transportation geographical location/position data is obtained from any source of transportation geographical location/position data as discussed herein, and/or as known in the art at the time of filing, and/or as developed after the time of filing.

In one embodiment, once the geographical location/position of the user mobile computing system and the transportation geographical location/position data is obtained, and/or is being monitored, the data is compared to determine the user's use of the transportation system.

In one embodiment, if a determination is made that the user's geographical location/position data is the same as the transportation geographical location/position data of a transportation element, such as a given bus or subway car, an assumption is made that the user is making use of the public transportation system, e.g., the user has boarded the transportation element.

In various embodiments, the user's geographical location/position data must remain the same as the transportation geographical location/position data of the transportation element, or a threshold number of data points indicating the user's geographical location/position data is the same as the transportation geographical location/position data of the transportation element, before an assumption is made that the user is making use of the transportation system.

In this way it is less likely the user will be incorrectly charged for using the transportation element. For instance, if a user has gone into a subway station to buy a paper, or a hotdog, when a given subway train is in the station, the user could be incorrectly assumed to be on the subway car. However, once the subway car leaves the station, or the user moves on, it is revealed that this was not a boarding/use event.

In various embodiments, the user's geographical location/position must be the same as the transportation geographical location/position data of the transportation element at one or more remote locations, or locations only used by, or accessible by, the transportation element before an assumption is made that the user is making use of the transportation system. As an example, in one embodiment, if the user's geographical location/position data matches the transportation geographical location/position data of a train at a position where there is virtually nothing but train track, then it can safely be assumed that the user is on the train.

In one embodiment, once the user's geographical location/position data differs from the transportation geographical location/position data of the transportation element, it is further assumed that the user is no longer making use of the public transportation system, e.g., the user has gotten off at his or her desired stop.

In various embodiments, the same mobile communication channel established with the user mobile computing system to track the user's geographical location/position and/or communicate with the user, is also used to provide various information to the user via the user's mobile computing system. For instance, in various embodiments, the user is provided information regarding traffic, wait times, system outages, and/or proposed alternative routes and systems via the user mobile communication channel. In various embodiments, the user is provided offers, advertisements, and other marketing information via the user mobile communication channel.

In one embodiment, data indicating the user's assumed use of the transportation system, calculated as described above, is then recorded and credited to the user's account with the automated transportation use and billing system.

In one embodiment, at predetermined intervals of time, such as monthly, the user is automatically provided a bill, and/or charged, for the user's recorded use of the transportation system. In one embodiment, the user is billed via the user's mobile computing system and/or the one or more automated transportation use and billing system applications, and/or using the registration data provided by the user at the time the user signed up for the automated transportation use and billing system. In other embodiments, the user is billed for the user's recorded use of the transportation system via any billing/payment mechanism as discussed herein, and/or as known in the art at the time of filing, and/or as developed after the time of filing.

In various embodiments, the user's bill is calculated taking into account any use related discounts, offers, and/or other billing policies, based on user age, zone, elective programs, or any other criteria for which the user has qualified as indicated by the user's transportation usage data.

In various embodiments, data indicating the user's assumed use of the transportation system, calculated as described above, is recorded and the aggregated data for multiple users is used by one or more parties to determine current, and future public transportation usage and needs, and/or for public transportation system modeling.

As noted above, using the process for providing an automated transportation use and billing system discussed herein, once a user registers with the automated transportation use and billing system, the user is automatically provided virtually unlimited access to associated transportation systems via a mobile computing system, such as a mobile phone. Consequently, using the process for providing an automated transportation use and billing system discussed herein, there is no need to obtain tickets, tokens, or passes, or to keep any additional item on the user's person other than a mobile computing system, such as a mobile phone, which the user normally carries with them anyway.

In addition, using the process for providing an automated transportation use and billing system discussed herein, the user's transportation usage is tracked and the user is billed automatically on a periodic basis. Consequently using the process for providing an automated transportation use and billing system discussed herein, the user is provided virtually "hands free" access to public transportation.

Hardware System Architecture

FIG. 1 is a block diagram of an exemplary hardware architecture for implementing one embodiment of a method and system for automated transportation use tracking and billing, such as exemplary process 200 discussed herein, that includes: a user mobile computing system 100, e.g., a mobile phone associated with a user; an optional transportation computing system 150, e.g., a computing system or positional signal generation system that indicates a position of a transportation system element; a provider computing system 120, e.g., a backend and/or cloud based server system associated with the provider of a process for providing an automated transportation use and billing system, such as process 200; a database 170, a communications link 140A, e.g., a first communications link; a communications link 140B, e.g., a second communications link; and communications link 140C, e.g., a third communications link.

As seen in FIG. 1, user mobile computing system 100 typically includes a central processing unit (CPU) 101, a communications interface 105, and a memory system 103. In one embodiment, memory system 103 includes all, or part of, process for providing an automated transportation use and billing system, shown as process 200 in FIGS. 1 and 2.

In one embodiment, memory system 103 includes all, or part of, user registration/profile data 102. As noted above, in one embodiment, as part of the registration process, the user provides user registration/profile data 102. In one embodiment, user registration/profile data 102 is provided by the user through user mobile computing system 100. In one embodiment, user registration/profile data 102 is provided by the user via a user interface device (not shown in FIG. 1) such as, but not limited to, a keyboard, mouse, touchpad, voice command recognition system, or any other device capable of providing user input to a computing system and/or for translating user actions into computing system operations, whether available or known at the time of filing or as developed later.

In various embodiments, user registration/profile data 102 includes, but is not limited to, one or more of: data indicating the user's name; data indicating the user's e-mail address or user associated social media accounts; data indicating the user's telephone number and/or SMS contact number; data indicating the user's physical address; data indicating a payment method and/or credit card/debit card information associated with the user; data indicating the user's agreement to various terms and conditions of use; and/or any other user registration/profile data 102 desired/required by the provider of the automated transportation use and billing system.

In various embodiments, as part of the registration process, user registration/profile data 102 is obtained designating/registering user mobile computing system 100 with the automated transportation use and billing system. In addition, as part of the registration process, the user provides user registration/profile data 102 indicating that the user gives the automated transportation use and billing system permission to track the geographical location/position of the designated/registered user mobile computing system.

In one embodiment, memory system 103 includes all, or part of, user location/position data 102. As noted above, in various embodiments, the geographical location/position of the user mobile computing system is monitored/tracked, and stored as user location/position data 102, based on analysis of a communication signal emitted by user mobile computing system 100, and/or the relay stations used by user mobile computing system 100.

In various embodiments, the geographical location/position of the user mobile computing system is monitored/tracked, and stored as user location/position data 102, using a Global Positioning Satellite (GPS) system and/or a GPS capability provided with user mobile computing system 100. In various embodiments, user location/position data 102 is provided by user mobile computing system 100 itself via one or more data links. In various embodiments, user location/ position data 102 is determined and/or provided by any method, means, mechanism, or procedure for determining a position of a user mobile computing system as discussed herein, and/or as known in the art at the time of filing, and/or as developed after the time of filing.

In various embodiments, the geographical location/position of user mobile computing system 100 is monitored, and stored as user location/position data 102, on a periodic basis such as, but limited to, every few seconds, every few fractions of a second, every minute, or every few minutes.

In one embodiment, user mobile computing system 100 is a mobile computing system such as, but not limited to: a mobile phone; a smart phone; an internet appliance; any SMS capable system; or any other mobile computing system as discussed herein, and/or as known in the art at the time of filing, and/or as developed after the time of filing.

In one embodiment, user mobile computing system 100 is any computing system discussed herein, and/or as known in the art at the time of filing, and/or as developed after the time of filing that includes components that can execute all, or part, of process for providing an automated transportation use and billing system 200 in accordance with at least one of the embodiments as described herein.

In various embodiments, user mobile computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user mobile computing system 100, whether available or known at the time of filing or as later developed.

In one embodiment, process for providing an automated transportation use and billing system 200 is entered, in whole, or in part, into user mobile computing system 100 via a web-based download and one or more applications.

As also seen in FIG. 1, transportation computing system 150 typically includes a central processing unit (CPU) 151, a communications interface 155, and a memory system 153. In one embodiment, memory system 153 includes all, or part of, process for providing an automated transportation use and billing system 200.

In one embodiment, memory system 153 includes all, or part of, transportation location/position data 152. In one embodiment, transportation location/position data 152 includes transportation geographical location/position data indicating the geographical location/position of one or more transportation elements within one or more transportation systems.

In various embodiments, transportation computing systems 150 is one or more computing systems and/or signal generation devices that generate transportation location/position data 152 in relative real time onboard the one or more transportation elements within the one or more transportation systems. As one illustrative example, in one embodiment, transportation computing system 150 is one or more computing systems and/or signal generation devices that generate transportation location/position data 152 in the form of a position/location signal generated on board a transportation element, such as a given bus or streetcar. As another illustrative example, in one embodiment, transportation computing system 150 is one or more computing systems and/or signal generation devices that generate transportation location/position data 152 for a given subway car that indicates the position/location of the subway car.

In some embodiments, the transportation location/position data 152 is obtained from a database, such as database 170, which includes data regarding the estimated position of the one or more transportation elements within the one or more transportation systems as determined using the normal operating schedules and data indicating any delays. In various embodiments, transportation location/position data 152 is obtained from any source of transportation geographical location/position data as discussed herein, and/or as known in the art at the time of filing, and/or as developed after the time of filing.

In one embodiment, transportation computing system 150 is any computing system discussed herein, and/or as known in the art at the time of filing, and/or as developed after the time of filing that includes components that can execute all, or part, of process for providing an automated transportation use and billing system 200 in accordance with at least one of the embodiments as described herein.

In various embodiments, transportation computing system 150 may further include standard consumer interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, user mobile computing system 100, whether available or known at the time of filing or as later developed.

As seen in FIG. 1, in one embodiment, provider computing system 120 includes one or more processors, CPU(s) 121, a communication interface 122, and a memory 123.

As seen in FIG. 1, in one embodiment, memory 123 includes all, or part of, a process for providing an automated transportation use and billing system 200.

As seen in FIG. 1, in one embodiment, memory 123, and/or process for providing an automated transportation use and billing system 200, includes transportation location/position data 152 that is received from transportation computing system 150.

As seen in FIG. 1, in one embodiment, memory 123, and/or process for providing an automated transportation use and billing system 200, includes user location/position data 102 that is received from user mobile computing system 100.

In one embodiment, user location/position data 102 and transportation location/position data 152 are used as input to analysis/compare module 124. In one embodiment, at analysis/compare module 124 user location/position data 102 and transportation location/position data 152 are compared to determine the user's use of the transportation system.

In one embodiment, if a determination is made that user location/position data 102 and transportation location/position data 152 match, an assumption is made that the user is making use of the public transportation system, e.g., the user has boarded the transportation element.

In various embodiments, user location/position data 102 and transportation location/position data 152 must remained matched, or match a threshold number of times, before an assumption is made that the user is making use of the transportation system.

In various embodiments, user location/position data 102 and transportation location/position data 152 must match at one or more remote locations, or locations only used by, or accessible by, the transportation element before an assumption is made that the user is making use of the transportation system. As an example, in one embodiment, if the user's geographical location/position data matches the transportation geographical location/position data of a train at a position where there is virtually nothing but train track, then it can safely be assumed that the user is on the train.

In one embodiment, once user location/position data 102 and transportation location/position data 152 fail to match, it is further assumed that the user is no longer making use of the public transportation system, e.g., the user has gotten off at his or her desired stop.

In one embodiment, data indicating the user's assumed use of the transportation system, calculated as described above by analysis/compare module 124, is then recorded and credited to the user's account using billing module 126.

In one embodiment, at predetermined intervals of time, such as monthly, the user is automatically provided a bill, and/or charged, for the user's recorded use of the transportation system via billing data 160. In one embodiment, the user is billed via user mobile computing system 100 and/or the one or more automated transportation use and billing system applications, and/or using user registration/profile data 104 provided by the user at the time the user signed up for the automated transportation use and billing system. In other embodiments, the user is billed for the user's recorded use of the transportation system via any billing/payment mechanism as discussed herein, and/or as known in the art at the time of filing, and/or as developed after the time of filing.

In various embodiments, provider computing system 120 is any computing system discussed herein, and/or as known in the art at the time of filing, and/or as developed after the time of filing that includes components that can execute all, or part, of a process for providing an automated transportation use and billing system 200, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function.

As discussed in more detail below, in one embodiment, database 170 is under the control of a process for providing an automated transportation use and billing system, such as exemplary process 200, and includes all, or part of, user location/position data 102 and transportation location/position data 152.

In one embodiment, computing systems 100 and 150, and database 170, are linked to provider computing system 120 via communications channels 140A, 140B, and 140C, respectively. In various embodiments, any, or all, of communications channels 140A, 140B, and 140C can be, but are not limited to: a mobile communication link, such as a mobile phone link; a land-line phone link; a cable-based communications link; a satellite communications link; the Internet, or other network communications link; and/or any other communications link, or combination of communications links, as discussed herein, and/or as known in the art at the time of filing, and/or as developed after the time of filing.

In various embodiments, any, or all, of communications channels 140A, 140B, and 140C, are any SMS communication link as discussed herein, and/or as known in the art at the time of filing, and/or as developed after the time of filing.

In various embodiments any, or all, of communications channels 140A, 140B, and 140C include any network or network system that is of interest to a consumer such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In one embodiment, computing systems 100 and 150, database 170, provider computing system 120, and any, or all, of communications channels 140A, 140B, and 140C, are part of a cloud computing environment.

Those of skill in the art will readily recognize that the components shown in FIG. 1 and their respective sub-components, are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100, 150, database 170, and provider computing system 120 are not relevant.

Although a process for providing an automated transportation use and billing system, such as process for providing an automated transportation use and billing system 200, is sometimes referred to herein, alternatively, as a process, an application, a module, a program, a component of a software system, a component of a software package, a component of a parent system, a plug-in, or a feature of a parent system, this terminology is illustrative only. In some embodiments, a process for providing an automated transportation use and billing system, such as process for providing an automated transportation use and billing system 200, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPU(s) 121.

In one embodiment, a process for providing an automated transportation use and billing system, such as process for providing an automated transportation use and billing system 200, is a computer application or process implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

In accordance with one embodiment, a method and system for automated transportation use tracking and billing includes a process for providing an automated transportation use and billing system whereby, in one embodiment, a user subscribes, or otherwise registers with, an automated transportation use and billing system via a user mobile computing system, such as a mobile phone associated with the user, and/or one or more automated transportation use and billing system applications, such as a mobile application implemented, at least in part, on the user mobile computing system.

In one embodiment, the user's geographical location/position is monitored via the user's mobile computing system and/or one or more automated transportation use and billing system applications. In one embodiment, the geographical location/position of one or more elements of one or more public transportation systems is also monitored and periodically compared with the user's geographical location/position. In one embodiment, when a determination is made that the user's geographical location/position is the same as the geographical location/position of a public transportation system element, such as a bus or subway train, an assumption is made that the user is making use of the public transportation system, e.g., the user has boarded the public transportation system element. In one embodiment, once the user's geographical location/position data differs from the public transportation system element's geographical location/position data, it is further assumed that the user is no longer making use of the public transportation system, e.g., the user has gotten off at his or her desired stop. In one embodiment, data indicating the users assumed use of the public transportation system, calculated as described above, is then recorded and credited to the user's account. In one embodiment, at predetermined intervals of time, such as monthly, the user is automatically provided a bill, and/or charged, for his or her use of the public transportation system. In one embodiment, the user is billed via the user's mobile computing system and/or the one or more automated transportation use and billing system applications, and/or using the registration data provided by the user at the time the user signed up for the automated transportation use and billing system.

Figure 2:
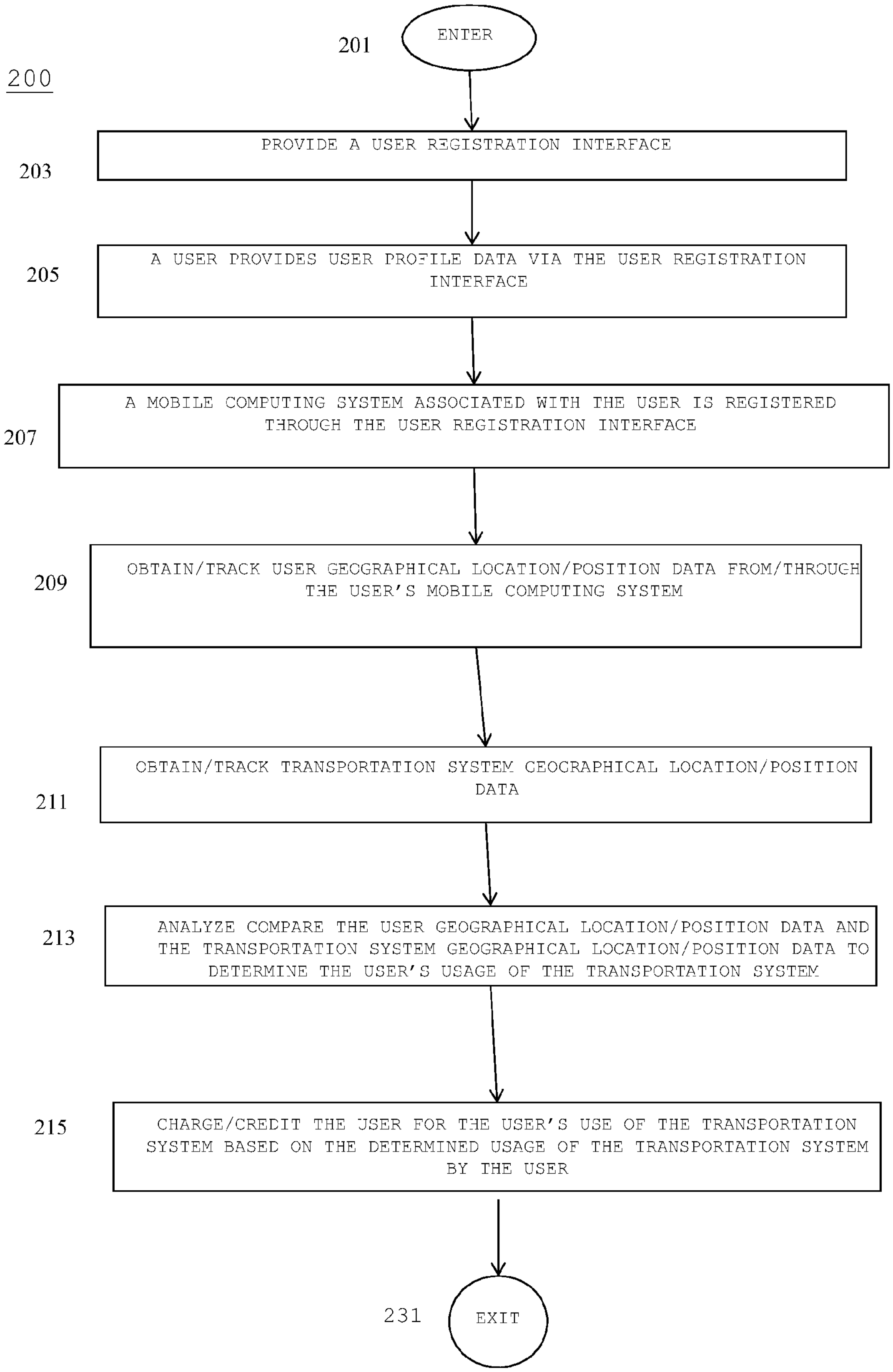
FIG. 2 is a flow chart depicting a process for providing an automated transportation use and billing system in accordance with one embodiment.

FIG. 2 a flow chart depicting a process for providing an automated transportation use and billing system 200 in accordance with one embodiment. Process for providing an automated transportation use and billing system 200 begins at ENTER OPERATION 201 of FIG. 2 and process flow proceeds to PROVIDE A USER REGISTRATION INTERFACE OPERATION 203.

In one embodiment, at PROVIDE A USER REGISTRATION INTERFACE OPERATION 203 one or more automated transportation use and billing system applications, such as a mobile application implemented, at least in part, on a user mobile computing system, are provided that include a user registration interface.

In one embodiment, at PROVIDE A USER REGISTRATION INTERFACE OPERATION 203 a user mobile computing system, such as a mobile phone associated with the user, is provided with, and/or implements, one or more automated transportation use and billing system applications, or "apps", such as a mobile automated transportation use and billing system application, or mobile automated transportation use and billing system app.

Herein, the terms "application" or "app." include, but are not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing.

In various embodiments, process for providing an automated transportation use and billing system 200, and the user registration interface, is provided by, used by, and/or otherwise associated with, one or more public transportation systems.

Herein, the term "public transportation system" includes any transportation system designed to carry multiple passengers. This includes transportation systems owned and operated by governments, municipalities, private parties, corporations, or any other entity.

In various embodiments, process for providing an automated transportation use and billing system 200, and the user registration interface, is provided by, and/or otherwise associated with, one or more public transportation systems such as, but not limited to, one or more publically operated subway systems, train systems, street car systems, bus systems, and/or any other public transportation system owed and/or operated, in whole or in part, by a public institution, as discussed herein, and/or as known in the art at the time of filing, and/or as developed after the time of filing.

In various embodiments, process for providing an automated transportation use and billing system 200, and the user registration interface, is provided by, and/or otherwise associated with, one or more privately owned and/or operated public transportation systems such as, but not limited to, one or more privately owned subway systems, train systems, street car systems, bus systems, taxi systems, airlines, and/or any other public transportation system owed and/or operated, in whole or in part, by a private party or institution, as discussed herein, and/or as known in the art at the time of filing, and/or as developed after the time of filing.

In various embodiments, the one or more automated transportation use and billing system applications, and the user registration interface, are provided to users via a web-site. In various embodiments, the one or more automated transportation use and billing system applications, are downloadable applications.

In various embodiments, the one or more automated transportation use and billing system applications, and the user registration interface, are provided to users as computer program products.

In various embodiments, the one or more automated transportation use and billing system applications, and the user registration interface, are provided to users via any mechanism, process, or procedure for providing one or more automated transportation use and billing system applications, and/or a user registration interface, as discussed herein, and/or as known in the art at the time of filing, and/or as developed after the time of filing.

In one embodiment, one or more automated transportation use and billing system applications, such as a mobile application implemented, at least in part, on a user mobile computing system, are provided that include a user registration interface at PROVIDE A USER REGISTRATION INTERFACE OPERATION 203, process flow proceeds to A USER PROVIDES USER PROFILE DATA VIA THE USER REGISTRATION INTERFACE OPERATION 205.

In one embodiment, at A USER PROVIDES USER PROFILE DATA VIA THE USER REGISTRATION INTERFACE OPERATION 205 a user subscribes, or otherwise registers with, an automated transportation use and billing system using the one or more automated transportation use and billing system applications and user registration interface of PROVIDE A USER REGISTRATION INTERFACE OPERATION 203.

In one embodiment, at A USER PROVIDES USER PROFILE DATA VIA THE USER REGISTRATION INTERFACE OPERATION 205 the user subscribes, or otherwise registers with, the automated transportation use and billing system only once, i.e., before the first use of the automated transportation use and billing system.

In various embodiments, as part of the registration process, at A USER PROVIDES USER PROFILE DATA VIA THE USER REGISTRATION INTERFACE OPERATION 205 the user provides user profile information. In one embodiment, the user profile information is provided by the user through the user mobile computing system via a user interface device such as, but not limited to, a keyboard, mouse, touchpad, voice command recognition system, or any other device capable of providing user input to a computing system and/or for translating user actions into computing system operations, whether available or known at the time of filing or as developed later.

In various embodiments, the user profile information of at A USER PROVIDES USER PROFILE DATA VIA THE USER REGISTRATION INTERFACE OPERATION 205 includes, but is not limited to, one or more of: data indicating the user's name; data indicating the user's e-mail address or user associated social media accounts; data indicating the user's telephone number and/or SMS contact number; data indicating the user's physical address; data indicating a payment method and/or credit card/debit card information associated with the user; data indicating the user's agreement to various terms and conditions of use; and/or any other user profile data desired/required by the provider of the automated transportation use and billing system.

In one embodiment, once the user subscribes, or otherwise registers with, an automated transportation use and billing system using the one or more automated transportation use and billing system applications and user registration interface of PROVIDE A USER REGISTRATION INTERFACE OPERATION 203 at A USER PROVIDES USER PROFILE DATA VIA THE USER REGISTRATION INTERFACE OPERATION 205, process flow proceeds to A MOBILE COMPUTING SYSTEM ASSOCIATED WITH THE USER IS REGISTERED THROUGH THE USER REGISTRATION INTERFACE OPERATION 207.

In one embodiment, at A MOBILE COMPUTING SYSTEM ASSOCIATED WITH THE USER IS REGISTERED THROUGH THE USER REGISTRATION INTERFACE OPERATION 207 data is obtained designating/registering a user mobile computing system associated with the user to be used with the automated transportation use and billing system.

In one embodiment, at A MOBILE COMPUTING SYSTEM ASSOCIATED WITH THE USER IS REGISTERED THROUGH THE USER REGISTRATION INTERFACE OPERATION 207 data is obtained designating/registering a user mobile computing system associated with the user to be used with the automated transportation use and billing system directly from a user mobile computing system used to provide the registration data at PROVIDE A USER REGISTRATION INTERFACE OPERATION 203.

In addition, in one embodiment, at A MOBILE COMPUTING SYSTEM ASSOCIATED WITH THE USER IS REGISTERED THROUGH THE USER REGISTRATION INTERFACE OPERATION 207 the user provides data indicating that the user gives the automated transportation use and billing system permission to track the geographical location/position of the designated/registered user mobile computing system.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; an Internet appliance; or any other device and/or computing system that includes components that can execute all, or part, of any one of the processes and/or operations as described herein.

In addition, as used herein, the term mobile computing system, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the mobile computing systems are connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, once data is obtained designating/registering a user mobile computing system associated with the user to be used with the automated transportation use and billing system at A MOBILE COMPUTING SYSTEM ASSOCIATED WITH THE USER IS REGISTERED THROUGH THE USER REGISTRATION INTERFACE OPERATION 207, process flow proceeds to OBTAIN/TRACK USER GEOGRAPHICAL LOCATION/POSITION DATA FROM/THROUGH THE USER'S MOBILE COMPUTING SYSTEM OPERATION 209.

In one embodiment, at OBTAIN/TRACK USER GEOGRAPHICAL LOCATION/POSITION DATA FROM/THROUGH THE USER'S MOBILE COMPUTING SYSTEM OPERATION 209 the user's geographical location/position is monitored via the user's mobile computing system and/or one or more automated transportation use and billing system applications.

In one embodiment, once the user has registered with the automated transportation use and billing system, provided user profile data, and designated/registered the user mobile computing system, the geographical location/position of the user mobile computing system, and presumably the user, is monitored/tracked at OBTAIN/TRACK USER GEOGRAPHICAL LOCATION/POSITION DATA FROM/THROUGH THE USER'S MOBILE COMPUTING SYSTEM OPERATION 209.

In various embodiments, the geographical location/position of the user mobile computing system is monitored/tracked at OBTAIN/TRACK USER GEOGRAPHICAL LOCATION/POSITION DATA FROM/THROUGH THE USER'S MOBILE COMPUTING SYSTEM OPERATION 209 based on analysis of a communication signal emitted by the user mobile computing system, and/or the relay stations used by the user mobile computing system.

In various embodiments, the geographical location/position of the user mobile computing system is monitored/tracked at OBTAIN/TRACK USER GEOGRAPHICAL LOCATION/POSITION DATA FROM/THROUGH THE USER'S MOBILE COMPUTING SYSTEM OPERATION 209 using a Global Positioning Satellite (GPS) system and/or a GPS capability provided with the user mobile computing system.

In various embodiments, the position of the user mobile computing system is provided at OBTAIN/TRACK USER GEOGRAPHICAL LOCATION/POSITION DATA FROM/THROUGH THE USER'S MOBILE COMPUTING SYSTEM OPERATION 209 by the user mobile computing system itself via one or more data links.

In various embodiments, the position of the user mobile computing system is determined and/or provided at OBTAIN/TRACK USER GEOGRAPHICAL LOCATION/POSITION DATA FROM/THROUGH THE USER'S MOBILE COMPUTING SYSTEM OPERATION 209 by any method, means, mechanism, or procedure for determining a position of a user mobile computing system as discussed herein, and/or as known in the art at the time of filing, and/or as developed after the time of filing.

In various embodiments, at OBTAIN/TRACK USER GEOGRAPHICAL LOCATION/POSITION DATA FROM/THROUGH THE USER'S MOBILE COMPUTING SYSTEM OPERATION 209 the geographical location/position of the user mobile computing system is monitored only after the user has activated a monitor feature, and/or process for providing an automated transportation use and billing system 200, through the one or more automated transportation use and billing system applications of PROVIDE A USER REGISTRATION INTERFACE OPERATION 203.

In various embodiments, at OBTAIN/TRACK USER GEOGRAPHICAL LOCATION/POSITION DATA FROM/THROUGH THE USER'S MOBILE COMPUTING SYSTEM OPERATION 209 the geographical location/position of the user mobile computing system is monitored on a periodic basis such as, but limited to, every few seconds, every few fractions of a second, every minute, every few minutes, or at any frequency desired.

In one embodiment, once the user has registered with the automated transportation use and billing system, provided user profile data, designated/registered the user mobile computing system, and the geographical location/position of the user mobile computing system, and presumably the user, is being monitored/tracked at OBTAIN/TRACK USER GEOGRAPHICAL LOCATION/POSITION DATA FROM/THROUGH THE USER'S MOBILE COMPUTING SYSTEM OPERATION 209, process flow proceeds to OBTAIN/TRACK TRANSPORTATION SYSTEM GEOGRAPHICAL LOCATION/POSITION DATA OPERATION 211.

In one embodiment, at OBTAIN/TRACK TRANSPORTATION SYSTEM GEOGRAPHICAL LOCATION/POSITION DATA OPERATION 211 the geographical location/position of one or more elements of one or more public transportation systems is monitored and/or obtained.

Herein, the term "transportation element" includes any transportation unit or means within, or used with, or associated with, a public transportation system. For instance, in various embodiments, a "transportation element" can be an individual bus, train, subway car, taxi, aircraft, streetcar, automobile, or any other individual, or connected, vehicle, unit, structure, method, or means, used by a public transportation system to transport users.

In various embodiments, the transportation geographical location/position data is obtained at OBTAIN/TRACK TRANSPORTATION SYSTEM GEOGRAPHICAL LOCATION/POSITION DATA OPERATION 211 in relative real time from one or more computing systems and/or signal generation device that are onboard the one or more transportation elements within the one or more transportation systems.

As one illustrative example, in one embodiment, the transportation geographical location/position data for a given bus is obtained from a position/location signal generated on board the bus.

As another illustrative example, in one embodiment, the transportation geographical location/position data for a given subway car is obtained from a computing system on the subway car that indicates the position/location of the subway car.

In some embodiments, the transportation geographical location/position data is obtained at OBTAIN/TRACK TRANSPORTATION SYSTEM GEOGRAPHICAL LOCATION/POSITION DATA OPERATION 211 from a database that includes data regarding the estimated position of the one or more transportation elements within the one or more transportation systems as determined using the normal operating schedules and data indicating any delays.

As an example, in one embodiment, if a given transportation element is determined to have been running on time at a given time on a given date, then the database of scheduled routes is used to determine the transportation element's geographical location/position data at a given time.

In various embodiments, the transportation geographical location/position data is obtained at OBTAIN/TRACK TRANSPORTATION SYSTEM GEOGRAPHICAL LOCATION/POSITION DATA OPERATION 211 from any source of transportation geographical location/position data as discussed herein, and/or as known in the art at the time of filing, and/or as developed after the time of filing.

In one embodiment, once the geographical location/position of one or more elements of one or more public transportation systems is being monitored and/or is obtained at OBTAIN/TRACK TRANSPORTATION SYSTEM GEOGRAPHICAL LOCATION/POSITION DATA OPERATION 211, process flow proceeds to ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213.

In one embodiment, at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213 the geographical location/position data of the user mobile computing system of OBTAIN/TRACK USER GEOGRAPHICAL LOCATION POSITION DATA FROM/THROUGH THE USER'S MOBILE COMPUTING SYSTEM OPERATION 209 and the transportation geographical location/position data of OBTAIN/TRACK TRANSPORTATION SYSTEM GEOGRAPHICAL LOCATION/POSITION DATA OPERATION 211 is analyzed and/or compared to determine the user's use of the transportation system.

In one embodiment, if, at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213, a determination is made that the user's geographical location/position data is the same as the transportation geographical location/position data of a transportation element, such as a given bus or subway car, an assumption is made that the user is making use of the public transportation system, e.g., the user has boarded the transportation element.

In various embodiments, in order to improve accuracy, one or more operational rules are implemented at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213.

For instance, as one illustrative example, an operational rule is implemented at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213 requiring that the user's geographical location/position data must remain the same as the transportation geographical location/position data of the transportation element for a threshold period of time before an assumption is made that the user is making use of the transportation system.

As another illustrative example, an operational rule is implemented at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213 requiring a threshold number of data points, temporally removed, indicating the user's geographical location/position data is the same as the transportation geographical location/position data of the transportation element before an assumption is made that the user is making use of the transportation system.

In this way it is less likely the user will be incorrectly charged for using the transportation element. For instance, if a user has gone into a subway station to buy a paper, or a hotdog, when a given subway train is in the station, the user could be incorrectly assumed to be on the subway car. However, once the subway car leaves the station, or the user moves on, it is revealed that this was not a boarding/use event.

As another illustrative example, an operational rule is implemented at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213 requiring the user's geographical location/position data be the same as the transportation geographical location/position data of the transportation element at one or more remote locations, or locations only used by, or accessible by, the transportation element before an assumption is made that the user is making use of the transportation system.

As an example, in one embodiment, if the user's geographical location/position data matches the transportation geographical location/position data of a train at a position where there is virtually nothing but train track, such as in a tunnel, then it can safely be assumed that the user is on the train.

In one embodiment, once the user's geographical location/position data differs from the transportation geographical location/position data of the transportation element, it is further assumed that the user is no longer making use of the public transportation system, e.g., the user has gotten off at his or her desired stop.

In one embodiment data indicating the user's assumed use of the transportation system, calculated as described above, is then recorded as the user's transportation usage data. In one embodiment, the user's transportation usage data is then stored in the user's account with process for providing an automated transportation use and billing system 200.

In various embodiments, the user's transportation usage data calculated as described above, is recorded and the aggregated data for multiple users is used by one or more parties to determine current, and future public transportation usage and needs, and/or for other public transportation system modeling.

In one embodiment, once the geographical location/position of the user mobile computing system data of OBTAIN/TRACK USER GEOGRAPHICAL LOCATION POSITION DATA FROM/THROUGH THE USER'S MOBILE COMPUTING SYSTEM OPERATION 209 and the transportation geographical location/position data of OBTAIN/TRACK TRANSPORTATION SYSTEM GEOGRAPHICAL LOCATION/POSITION DATA OPERATION 211 is analyzed and/or compared to determine the user's use of the transportation system at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213, process flow proceeds to CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215.

In one embodiment, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user's transportation usage data indicating the user's assumed use of the transportation system, calculated at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213, is used to credit the user's account with the automated transportation use and billing system.

In one embodiment, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user is automatically provided a bill, and/or charged, for the user's recorded use of the transportation system at predetermined intervals of time, such as monthly.

In one embodiment, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user's bill is calculated taking into account any use related discounts, offers, and/or other billing policies, based on user age, zone, elective programs, or any other criteria for which the user has qualified as indicated by the user's transportation usage data. For instance, if the user's transportation usage data indicates the user has used the transportation system frequently enough to qualify for a frequent use/volume discount, then that frequent use/volume discount is automatically applied to the user's bill.

In one embodiment, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user is billed via the user's mobile computing system and/or the one or more automated transportation use and billing system applications, and/or using the registration data provided by the user at A USER PROVIDES USER PROFILE DATA VIA THE USER REGISTRATION INTERFACE OPERATION 205.

In other embodiments, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user is billed for the user's recorded use of the transportation system via any billing/payment mechanism as discussed herein, and/or as known in the art at the time of filing, and/or as developed after the time of filing.

In one embodiment, at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215 the user is provided a periodic summary of the user's use of the transportation system and/or cumulative receipt data that can be used for budgeting and tax purposes.

In various embodiments, the same mobile communication channel established with the user mobile computing system to track the user's geographical location/position and/or communicate with the user, is also used to provide various information to the user via the user's mobile computing system. For instance, in various embodiments, the user is provided information regarding traffic, wait times, system outages, and/or proposed alternative routes and systems via the user mobile communication channel. In various embodiments, the user is provided offers, advertisements, and other marketing information via the user mobile communication channel.

In one embodiment, once the user's transportation usage data indicating the user's assumed use of the transportation system, calculated at ANALYZE COMPARE THE USER GEOGRAPHICAL LOCATION/POSITION DATA AND THE TRANSPORTATION SYSTEM GEOGRAPHICAL LOCATION/POSITION DATA TO DETERMINE THE USER'S USAGE OF THE TRANSPORTATION SYSTEM OPERATION 213, is used to credit the user's account with the automated transportation use and billing system at CHARGE/CREDIT THE USER FOR THE USER'S USE OF THE TRANSPORTATION SYSTEM BASED ON THE DETERMINED USAGE OF THE TRANSPORTATION SYSTEM BY THE USER OPERATION 215, process flow proceeds to EXIT OPERATION 231.

In one embodiment at EXIT OPERATION 231 process for providing an automated transportation use and billing system 200 is exited to await new data.

Using process for providing an automated transportation use and billing system 200, once a user registers with the automated transportation use and billing system, the user is automatically provided virtually unlimited access to public transportation via a mobile computing system, such as a mobile phone. Consequently, using one embodiment of process for providing an automated transportation use and billing system 200, there is no need to obtain tickets, tokens, or passes, or to keep any additional item on the user's person other than a mobile computing system, such as a mobile phone, which the user normally carries with them anyway. In addition, using one embodiment of process for providing an automated transportation use and billing system 200, the user's public transportation usage is tracked and the user is billed automatically on a periodic basis. Consequently using one embodiment of process for providing an automated transportation use and billing system 200, the user is provided virtually "hands free" access to public transportation; thereby making public transportation more user-friendly, efficient, and hopefully, more widely acceptable.

In addition, using one embodiment of process for providing an automated transportation use and billing system 200, the user's public transportation usage is tracked and the user is automatically provided a receipt/summary of the user's public transportation system use and costs that can be used for budgetary and tax purposes. Consequently, the user is spared the difficulty of retaining individual receipts.

In addition to being a direct benefit to users of public transportation systems, process for providing an automated transportation use and billing system 200 can also significantly benefit providers of public transportation systems by not only attracting more users, but also by eliminating infrastructure and overhead currently required to provide token, pass, and ticket systems. As an example, the implementation of process for providing an automated transportation use and billing system 200 eliminates the need for ticket/token kiosks, turnstiles and/or gates, and ticket/token selling agents. These cost savings can then be passed on to users to make the public transportation systems an even more attractive alternative to private vehicles.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols.

Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations.

In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet, or a cloud.

Therefore, numerous variations, whether explicitly provided for by the specification or implied by the specification or not, may be implemented by one of skill in the art in view of this disclosure.

What is claimed is:

1. A system for providing an automated transportation use and billing system comprising:

one or more computing processors; and one or memories coupled to the one or more computing processors, the one or more memories having instructions stored therein which, when executed by the one or more processors, perform:

monitoring the geographical location of a user mobile computing system associated with a user and obtain user geographical location/position data;

obtaining transportation geographical location/position data associated with a public transportation system element;

analyzing the user geographical location/position data, geographical locations of transportation infrastructure, and the transportation geographical location/position data to determine that the user and the public transportation element are at a location only available to be used by the transportation element, thus determining when the user makes use of the public transportation system element, the analyzed geographical locations of transportation infrastructure at least including the geographical locations of train tracks; and charging, as a direct result of determining that the user and the public transportation element are at a location only used by the transportation element, the user for the determined use of the public transportation system element.

2. The system for providing an automated transportation use and billing system of claim 1, wherein;

the user mobile computing system is a mobile phone.

3. The system for providing an automated transportation use and billing system of claim 1, wherein;

the transportation geographical location/position data is obtained in relative real time from a computing system associated with the public transportation system element.

4. The system for providing an automated transportation use and billing system of claim 1, wherein;

the transportation geographical location/position data is obtained in relative real time from a tracking signal associated with the public transportation system element.

5. The system for providing an automated transportation use and billing system of claim 1, wherein;

the transportation geographical location/position data is obtained from a database indicating the estimated position of the public transportation system element at a given time.

6. The system for providing an automated transportation use and billing system of claim 1, wherein;

as long the user geographical location/position data matches the transportation geographical location/position data of the public transportation system element within a defined margin of error, the one or more processors determine that the user is making use of the public transportation system element.

7. The system for providing an automated transportation use and billing system of claim 1, wherein;

when the user geographical location/position data matches the transportation geographical location/position data of the public transportation system element within a defined margin of error for a defined threshold period of time, the one or more processors determine that the user is making use of the public transportation system element.

8. The system for providing an automated transportation use and billing system of claim 1, wherein;

when the user geographical location/position data matches the transportation geographical location/position data of the public transportation system element within a defined margin of error a defined threshold number of times that are temporally separated, the one or more processors determine that the user is making use of the public transportation system element.

9. The system for providing an automated transportation use and billing system of claim 1, wherein;

the user is automatically charged for all determined uses of public transportation system elements on periodic basis.

10. The system for providing an automated transportation use and billing system of claim 1, wherein;

a record of all charges for all determined uses of public transportation system elements is made available to the user.

11. An automated transportation use and billing system comprising:

a user mobile computing system associated with a user;

a public transportation system including one or more public transportation system elements; and one or more processors associated with one or more computing systems, the one or more processors associated with one or more computing systems configured to execute, and executing a process for providing an automated transportation use and billing system, the process for providing an automated transportation use and billing system including:

monitoring the geographical location of the user mobile computing system associated with a user and obtain user geographical location/position data;

obtaining transportation geographical location/position data associated with a public transportation system element of the public transportation system;

analyzing the user geographical location/position data, geographical locations of transportation infrastructure, and the transportation geographical location/position data to determine that the user and the public transportation element are at a location only available to be used by the transportation element, thus determining when the user makes use of the public transportation system element, the analyzed geographical locations of transportation infrastructure at least including the geographical locations of train tracks; and charging, as a direct result of determining that the user and the public transportation element are at a location only used by the transportation element, the user for the determined use of the public transportation system element.

12. The automated transportation use and billing system of claim 11, wherein;

the user mobile computing system is a mobile phone.

13. The automated transportation use and billing system of claim 11, wherein;

the transportation geographical location/position data is obtained in relative real time from a computing system associated with the public transportation system element.

14. The automated transportation use and billing system of claim 11, wherein;

the transportation geographical location/position data is obtained in relative real time from a tracking signal associated with the public transportation system element.

15. The automated transportation use and billing system of claim 11, wherein;

the transportation geographical location/position data is obtained from a database indicating the estimated position of the public transportation system element at a given time.

16. The automated transportation use and billing system of claim 11, wherein;

as long the user geographical location/position data matches the transportation geographical location/position data of the public transportation system element within a defined margin of error, the one or more processors associated with one or more computing systems determine that the user is making use of the public transportation system element.

17. The automated transportation use and billing system of claim 11, wherein;

when the user geographical location/position data matches the transportation geographical location/position data of the public transportation system element within a defined margin of error for a defined threshold period of time, the one or more processors associated with one or more computing systems determine that the user is making use of the public transportation system element.

18. The automated transportation use and billing system of claim 11, wherein;

when the user geographical location/position data matches the transportation geographical location/position data of the public transportation system element within a defined margin of error a defined threshold number of times that are temporally separated, the one or more processors associated with one or more computing systems determine that the user is making use of the public transportation system element.

19. The automated transportation use and billing system of claim 11, wherein;

the user is automatically charged for all determined uses of public transportation system elements on periodic basis.

20. The automated transportation use and billing system of claim 11, wherein;

a record of all charges for all determined uses of public transportation system elements is made available to the user.

* * * * *